(12) United States Patent
Wise

(10) Patent No.: US 7,677,446 B2
(45) Date of Patent: Mar. 16, 2010

(54) SYSTEM AND APPARATUS FOR TRANSACTIONS USING PREPAID CARDS

(76) Inventor: Kurt Wise, 4701 Washington Ave., Suite 210, Racine, WI (US) 53406

(*) Notice: Subject to any disclaimer, the term of this patent is extended or adjusted under 35 U.S.C. 154(b) by 841 days.

(21) Appl. No.: 11/504,984

(22) Filed: Aug. 16, 2006

(65) Prior Publication Data
US 2008/0041938 A1 Feb. 21, 2008

(51) Int. Cl.
*G06K 5/00* (2006.01)
(52) U.S. Cl. .................................. 235/380; 235/381
(58) Field of Classification Search ............ 235/380, 235/381, 383; 705/39
See application file for complete search history.

(56) References Cited

U.S. PATENT DOCUMENTS

| | | | |
|---|---|---|---|
| 5,708,782 A | 1/1998 | Larson et al. | |
| 6,336,098 B1 | 1/2002 | Fortenberry et al. | |
| 6,404,869 B1 * | 6/2002 | Henderson et al. | 379/144.01 |
| 6,805,289 B2 * | 10/2004 | Noriega et al. | 235/380 |
| 6,892,187 B2 | 5/2005 | Phillips et al. | |
| 2002/0194088 A1 | 12/2002 | Sheddan et al. | |
| 2003/0028426 A1 | 2/2003 | Banerjee et al. | |
| 2004/0148229 A1 | 7/2004 | Maxwell | |
| 2005/0267804 A1 | 12/2005 | Lonsbury et al. | |
| 2006/0262914 A1 * | 11/2006 | Cai | 379/114.16 |

FOREIGN PATENT DOCUMENTS

EP 1008077 A4 6/2000

* cited by examiner

*Primary Examiner*—Ahshik Kim
(74) *Attorney, Agent, or Firm*—Donald J. Ersler

(57) ABSTRACT

A system, method and apparatus having the capability of issuing at least one unique identifying card, associating a payment amount and face value with each unique identifying card and receiving a payment for each unique identifying card. The method, system and apparatus are further capable of crediting the payment to one or more revenue distribution recipients in real time and updating the face value of the unique identifying card in real time to reflect its use for a transaction, and of tracking information about the card and use of the card.

50 Claims, 16 Drawing Sheets

| Code | FV | Discount | DV | Biz | Agent | NFP | AC | NFPC | LC | Click | Media | MA | Ad | AA | RM | Assc | AsscArea | AsscCord | Expires | |
|---|---|---|---|---|---|---|---|---|---|---|---|---|---|---|---|---|---|---|---|---|
| R15001 | $15.00 | 10.00 % | $13.50 | 80.00 % | 1.50 % | 9.00 % | 0.25 % | 0.02 % | 0.20 % | 0.00 % | 0.00 % | 0.00 % | 0.00 % | 0.00 % | 0.00 % | 0.00 % | 0.00 % | 0.00 % | None | View Details |
| R25001 | $25.00 | 10.00 % | $22.50 | 80.00 % | 1.50 % | 9.00 % | 0.25 % | 0.02 % | 0.20 % | 0.00 % | 0.00 % | 0.00 % | 0.00 % | 0.00 % | 0.00 % | 0.00 % | 0.00 % | 0.00 % | None | View Details |
| R50001 | $50.00 | 10.00 % | $55.00 | 80.00 % | 1.50 % | 9.00 % | 0.25 % | 0.02 % | 0.20 % | 0.00 % | 0.00 % | 0.00 % | 0.00 % | 0.00 % | 0.00 % | 0.00 % | 0.00 % | 0.00 % | None | View Details |
| R10011 | $100.00 | 10.00 % | $90.00 | 80.00 % | 1.50 % | 9.00 % | 0.25 % | 0.02 % | 0.20 % | 0.00 % | 0.00 % | 0.00 % | 0.00 % | 0.00 % | 0.00 % | 0.00 % | 0.00 % | 0.00 % | None | View Details |
| R10002 | $10.00 | 10.00 % | $9.00 | 65.56 % | 1.50 % | 9.00 % | 0.25 % | 0.02 % | 0.20 % | 0.00 % | 0.00 % | 0.00 % | 0.00 % | 0.00 % | 0.00 % | 0.00 % | 0.00 % | 0.00 % | None | View Details |
| R25002 | $25.00 | 10.00 % | $22.50 | 65.56 % | 1.50 % | 9.00 % | 0.25 % | 0.02 % | 0.20 % | 0.00 % | 0.00 % | 0.00 % | 0.00 % | 0.00 % | 0.00 % | 0.00 % | 0.00 % | 0.00 % | None | View Details |
| R50002 | $50.00 | 10.00 % | $55.00 | 65.56 % | 1.50 % | 9.00 % | 0.25 % | 0.02 % | 0.20 % | 0.00 % | 0.00 % | 0.00 % | 0.00 % | 0.00 % | 0.00 % | 0.00 % | 0.00 % | 0.00 % | None | View Details |
| R10022 | $100.00 | 10.00 % | $90.00 | 65.56 % | 1.50 % | 9.00 % | 0.25 % | 0.02 % | 0.20 % | 0.00 % | 0.00 % | 0.00 % | 0.00 % | 0.00 % | 0.00 % | 0.00 % | 0.00 % | 0.00 % | None | View Details |
| R10003 | $10.00 | 10.00 % | $9.00 | 70.00 % | 1.50 % | 9.00 % | 0.25 % | 0.02 % | 0.20 % | 0.00 % | 0.00 % | 0.00 % | 0.00 % | 0.00 % | 0.00 % | 0.00 % | 0.00 % | 0.00 % | None | View Details |

Company Logo or Business Name ----1601

Certificate Identification Number----1604

Magnetic Strip ----1605

Figure 16

SYSTEM AND APPARATUS FOR TRANSACTIONS USING PREPAID CARDS

FIELD OF INVENTION

This invention relates to the field of using prepaid cards for customer transactions. More specifically, the invention relates to allocating card revenue to multiple persons and entities entitled to receive revenue when the card is used, and to tracking information about customer transactions, payments and discounts in real time.

BRIEF DESCRIPTION OF THE DRAWINGS

FIG. 15 shows a sample embodiment of a rate plan for allocating a payment received when a card is purchased.

FIG. 16 illustrates one embodiment of a card.

BACKGROUND

Figure 1:
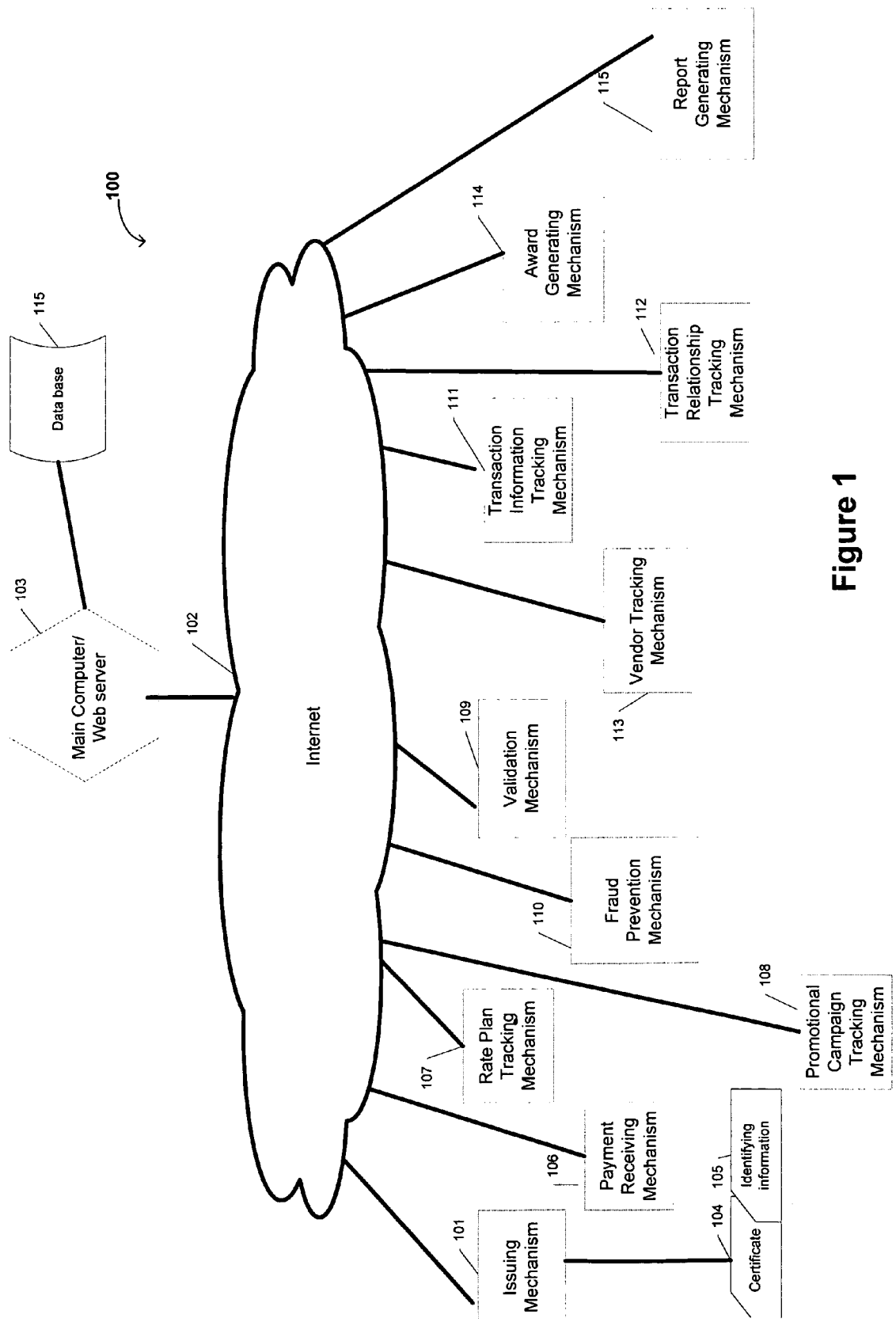
FIG. 1 is an overview of one embodiment of the transaction system.

Economic transactions include but are not limited to cash transactions, credit or debit card transactions, open account transactions, Internet based transactions, mail order transactions, electronic wire transfers or using prepaid cards or cards, tokens, barter, vouchers or coupons. They may further involve multi-vendor promotions, multi-level sales and distribution, auction, fundraising, or other methods of marketing.

For transactions involving cards, it is desirable to track information about how and where the card is used, the validity of the card, and to update the face value of the card contemporaneously or in real time. It is also desirable to accurately and efficiently distribute payment or revenue received from cards and transactions to persons and/or entities entitled to payment or compensation.

Various persons or entities, hereinafter referred to as "revenue distribution recipients" may be entitled to all or a portion of the payment or economic value received from a card-related transaction.

"Revenue distribution recipient" as used herein, is a term used to designate any individual or entity entitled to compensation on a fixed or percentage basis or based on any other form of recognition or formula for compensation when a payment for a card-related transaction is received. A revenue distribution recipient may include, but is not limited to, the following:

sales agents or persons or entities involved in the selling, transfer, or promotion of accounts or goods and services capable of being associated and tracked using the system described herein;

nonprofit entities, charitable organizations or other tax exempt and non-exempt entities and organizations to whom a fixed amount or a percentage of the payment may be donated pursuant to a rate plan;

management personnel;

one or more vendors;

representatives of vendors of goods and services, profit or nonprofit organizations and other public and private entities;

one or more customers;

administrative entities and personnel carrying out related or support functions;

a trade association or group of vendors having a common characteristic or affiliation; and media and other service entities and individuals and entities associated with the promotion, publicity, publication, and representation of revenue distribution recipients, vendors, and users of the system described herein.

"Card" as used herein, is any data or datum capable of identifying a particular customer or person or entity entitled to use a card as payment for goods and/or services. For example, a card could be a plastic card, metal card, paper card, a gift card, a rechargeable gift card, an electronically transmitted document such as an e-mail or file maintained on a computer or terminal, checking account information, a credit card number, other account number, a token, a numeric code, a magnetic code, a bar code, bio-informatics data, a code word, a digital signature, a sequence known to the purchaser or vendor, or other data capable of being associated with a commercial transaction, including combinations thereof. A card may be recognized by one or more vendors for a group of purposes of recognizing payment, receiving discounts, tracking account holder behavior and transactions, or for other purposes. The card may be made of paper, plastic, metal or any other material capable of transmitting printed, encoded or embedded information. The card may contain a magnetic strip or encoding capable of being read by devices configured to read credit card information, or other media capable of being encoded with such information. The card may access, use and/or alter information in a third party data base such as a credit card or bank database to facilitate, validate, initiate, or convey information about transactions using the card.

"Customer" as used herein, is an identified or unidentified individual or entity that receives and is the holder or bearer of card and is entitled to use one or more cards which may or may not be associated with a monetary amount, and which may or may not be used to track behavior and transactions of the card holder or user.

"Transaction" as used herein, is the exchange of value for goods and services, including the use of a card for goods and/or services, or any event which affects the face value of a card including payments which reflect the recharge value of the card.

"Recharge value" as used herein, is the updated face value of a card after a payment or transaction occurs which increases the face value of a previously issued card.

"Payment" as used herein, may include any form of currency, credit, electronic fund transfer, checking transaction, balance from a gift card, voucher or coupon or other transfer of value.

"Face value" as used herein, is a monetary or other amount associate to card which may be applied to the purchase of goods and/or services by vendors. The face value may be more, less or equal to the amount paid for the card, may be positive or negative and may also be a non-monetary value such as access rights. Upon the first use of a card, or upon other specified events and conditions, a card may have an updated face value which can be zero or any other monetary amount. An updated face value may reflect a transaction or other pre-designated event.

"Rate plan" as used herein is a distribution of revenue for card among one or more revenue distribution recipients, based upon policies, percentages and statistical or other information.

"Promotional campaign" as used herein is a strategic plan, which may be implemented using software, to associate a group of cards (herein referred to as a "tier") with a rate plan. In addition to associating a particular tier of cards with a particular rate plan, the promotional campaign may further specify the duration that a particular rate plan may be in effect (a "cycle"). A cycle may be a specified time frame, or perpetual. The cards within a tier may have an aggregate dollar value. The cards within a tier, may, but are not required to be, issued by the same vendor. Furthermore, a single vendor may be associated with one or multiple tiers of cards, and the face values of individual cards within a tier may vary. For example, one vendor may be associated with a tier of cards having varying face amounts and an aggregate monetary value of X, and such tier may be associated with rate plan Y. In this example, when cards exceeding X are sold, rate plan Z may be in effect for a second tier of cards associated with a different rate plan.

"Redemption policy" as used herein is any policy, program, promotion, rule or convention which affects the economic value associated with a card. Examples of redemption policies include but are not limited to expiration dates, vendor policies associated with acceptance of cards and the value attributed to cards, issuing rewards, issuing reward points or the scoring or tracking of transactions associated with card to determine its ultimate economic or redemption value.

"Real time" means any time between the attempt and/or completion of an initial transaction using card and the attempt and/or completion of a subsequent transaction using card.

"Vendor" as the term is used herein is any seller of goods and services or provider of information or access which accepts card as a form of payment or consideration or recognizes a card for any other purpose. "Multiple vendors" as the term is used herein, means a plurality of vendors that have no commercial or economic affiliation with each other, but may also include vendors that do have a common economic affiliation, ownership or characteristic with each other.

DETAILED DESCRIPTION OF EMBODIMENTS OF THE INVENTION

For the purpose of promoting an understanding of the present invention, reference will be made to multiple embodiments of a method and system and apparatus for creating and redeeming a card for a unique customer transaction, and for allocating payment to multiple parties or entities entitled to compensation as a result of the transaction in real time.

Various embodiments of the invention, as disclosed herein, provide one or more features associated with transactions including but not limited to, cash transactions, open account transactions, Internet based transactions, transactions involving prepaid gift cards, gift cards, tokens, credit and debit card transactions, coupons, promotions, mail order, auction, fundraising and other types of economic transactions.

It is to be understood, however, that the present invention may be embodied in various forms. For example, elements and components of a system may be presented in varying manners, and such representations are to be considered purely exemplary and representational of the elements or components which comprise the entire system, and not definitive of the order in which such components or elements perform a designated function. Similarly, steps of a method disclosed herein may be varied in the order that they perform. Acts and symbolically represented operations or instructions may, but are not required to, include the manipulation of electrical signals or biological signals by a CPU. Therefore, specific details and representations disclosed herein are not to be interpreted as limiting, but rather as a basis for the claims and as a representative basis for teaching one skilled in the art to employ the present invention. One of ordinary skill in the art will readily appreciate that modifications do not depart from the spirit and scope of the present invention, some of which are mentioned in the following description.

Data may be maintained on a computer readable medium including magnetic coding, magnetic disks, optical disks, organic memory, and any other volatile (e.g., Random Access Memory ("RAM")) or non-volatile (e.g., Read-Only Memory ("ROM")) mass storage system readable by a CPU. The computer readable medium includes cooperating or interconnected computer readable medium, which exist exclusively on the processing system or be distributed among multiple interconnected processing systems that may be local or remote to the processing system, or may be maintained by an outside entity or source.

With particular reference to the figures, the reader should also know that like numerals in different figures refer to the same elements of the embodiments. Moreover, it should be noted that each embodiment of the invention is not depicted by the figures.

Transaction system 100 is described with reference to FIG. 1. Issuing mechanism 101 communicates via Internet 102 with server 103 and issues at least one unique identifying transaction card (hereinafter referred to as a "card") 104 to a customer including identifying information 105 which is not duplicated on a subsequently issued card 104. Information about card 104 and related transactions are subsequently maintained in data base 115 which consists of at least one server or database, and which may include any configuration or network of servers, distributed computers or a network of computers, servers and distributed databases. Payment is received by payment receiving mechanism 106 and the payment is credited or allocated among one or more revenue distribution recipients according to a rate plan and promotional campaign using rate plan tracking mechanism 107. When a customer presents card 104 to a vendor for use in a transaction at the point-of-use at which card 104 is being redeemed or presented, validation mechanism 108 updates the face value of card 104 in real time to reflect that card 104 has been used in a transaction. The amount and manner in which the updated face value is calculated based upon a redemption policy. In some embodiments of system 100, validation mechanism 108 may be adapted, configured and otherwise capable of supplementing, updating, increasing or extending the face value of card 104 based on additional payments received or other events. Card 104 may be made of paper, plastic, metal or any other material capable of transmitting printed, encoded or embedded information. In the embodiment shown, card 104 contains magnetic strip 105 capable of being read by devices configured to read credit card information. Other embodiments may not contain a magnetic strip, but may contain other media capable of being encoded with information, or may, alternatively, numeric codes, code words, biological data or identifying information. In one embodiment of the invention, the card may access, use and/or alter information in a third party data base such as a credit card or bank database to facilitate, validate, initiate, or convey information about transactions using the card. In other embodiments the card may not be adapted to access, interface, interact or modify any third-party data base.

The embodiment of system 100 shown includes fraud prevention mechanism 109 for preventing fraud connection with the use of card 104, including but not limited to unauthorized use, theft, forgery and attempts to use card 104 for an amount other than its face value. However, alternative embodiments of system 100 may not include fraud prevention mechanism 109.

In the embodiment shown, a transaction includes, but is not limited to, presenting card 104 to a vendor for the purchase of goods and/or services, receipt of a payment for card 104, receipt of an amount for reissuance, credits issued by vendors, system participants, awards and promotions and other events which system 100 may be adapted to track, identify, record or capture and associate with card 104 or a customer. However, other embodiments may include different or additional types of transactions.

In the embodiment shown, system 100 includes transaction information tracking mechanism 110 which tracks information about the transaction including but not limited to information about the parties to the transaction, information about the goods and/or services purchased, geographic, demographic or temporal information associated with card 104. However, other embodiments may not track information about transactions, or may include more, less or different information about transactions.

The embodiment shown also includes transaction information relationship tracking mechanisms 111 for tracking one or more relationships between and/or among cards 104, transactions and contacts with a customer associated with a customer in real time. For example, in one embodiment a transaction relationship may be established for transactions occurring in a common zip code area, or for commonly owned vendor entities. Other transaction relationships may include but are not limited to product, price, demographic, temporal, customer, contact or other information pertaining to a transaction. However, in an alternate embodiment of system 100, one or both of information tracking mechanism 110 and information relationship tracking mechanism 111 or may more, less or different information or information and relationships may not be tracked.

In the embodiment shown, vendor tracking mechanism 112 is also shown. Vendor tracking mechanism 112 identifies vendors and tracks information about vendors who accept cards 104 as a form of payment for goods and/or services for cash, retail, in-person, billed, open account and other transactions. Vendor tracking mechanism 112 maintains data relevant to each vendor, which may include but is not limited to information about the status of promotions and campaigns for which a vendor is eligible, ineligible and or participating, the tax-exempt or non-exempt status of a vendor, revenue and income data, background information, demographic data, service, product and other information about the vendor relevant to a rate plan or promotional campaign. However, alternate embodiments of system 100 need not include vendor tracking mechanism 112 or may track more or less information about a vendor or vendors.

Also in the embodiment shown, system 100 further includes award generating mechanism 113. Award generating mechanism 113 tracks, associates, or issues additional awards to a customer, including but not limited to, discounts, points, premiums, incentives, monetary consideration, free items or other consideration. However, alternate embodiments of system 100 need not include award generating mechanism 114 or may issue different types of awards.

Also in the embodiment shown, system 100 further includes report generating mechanism 114. Report generating mechanism 114 is capable of generating reports, summaries and information which may be viewed on a computer interface relevant to cards 104, vendors, transactions, customers, rate plans, campaigns, the status of payments, rate plans and promotions and to any other data or relationship for which the system 100 retains data relevant to an account, transaction customer or vendor, as well as other customer information, as further defined herein. However, alternate embodiments of system 100 need not include report generating mechanism 114.

Issuing mechanism 101 may be one of several devices configured and adapted individually or in combination to be capable of associating card 104 with a customer. As used herein, issuing mechanism 101 may be any device for recording or encoding, including but not limited to alphanumeric or magnetically encoded information and transmitting information, including a memory device, keyboard, a typewriter, cash register, a touch-sensitive computer interface, a voice recognition device, the card itself, a paper document, a wireless device, laptop computer, mobile phone, personal information device, personal digital assistant, hand-held device, network appliance, pager, an analog device or a device used manually, microphones, touch-sensitive displays, transducer card readers, magnetic or paper tape readers, tablets, styluses, voice or handwriting recognizers, a server, a mechanism capable of reading biological information, a document reader or scanner, any other recording device commonly known and used in the art, and including combinations thereof. In the embodiment system 100 shown in FIG. 1, issuing mechanism 101 issues card 104 directly to a customer, but in other embodiments card 104 may be issued to one or more account issuers who subsequently associate cards 104 with a customer.

As used herein the payment receiving mechanism 106 may be one or more devices adapted individually or in combination and configured or otherwise capable of recording and transmitting payment information and allocating such information according to the parameters and requirements of a rate plan including an electronic check cashing system, a debit card processing system, a mechanism that accepts debit or credit cards, a memory device, a keyboard, a typewriter, cash register, a touch-sensitive computer interface, a voice recognition device, the card itself, a paper document, a wireless device, laptop computer, mobile phone, personal information device, personal digital assistant, hand-held device, network appliance, pager, an analog device or a device used manually, microphones, touch-sensitive displays, transducer card readers, magnetic or paper tape readers, tablets, styluses, voice or handwriting recognizers, a server, a mechanism capable of reading biological information, a document reader or scanner, any other recording device commonly known and used in the art, and including combinations thereof.

As used herein rate plan tracking mechanism 107 is one or more devices configured individually or in combination and adapted or otherwise capable of tracking an allocation, in real time, the amount received as payment for a card to one or more revenue distribution recipients based on one or more policies, promotional campaigns or other directives in effect. A rate plan or promotional campaign may be changed and modified by an authorized administrator, or person having authority to effectuate such changes reflected by rate plan tracking mechanism 107. Rate plan tracking mechanism 107 may be any device adapted and configured or otherwise capable of recording and transmitting payment information and allocating such information according to the parameters and requirements of a rate plan. Rate plan tracking mechanism 107 may include including a keyboard, a typewriter, cash register, a touch-sensitive computer interface, a voice recognition device, the card itself, a paper document, a wireless device, laptop computer, mobile phone, personal information device, personal digital assistant, hand-held device, network appliance, pager, an analog device or a device used manually, microphones, touch-sensitive displays, transducer card readers, magnetic or paper tape readers, tablets, styluses, voice or handwriting recognizers, a server, a mechanism capable of reading biological information, a document reader or scanner, any other recording device commonly known and used in the art, and including combinations thereof.

In the embodiment shown, validation mechanism 108 maintains information about cards 104, including the initial monetary value, the recharge value and/or an updated value associated with each card 104 reflecting transactions and monetary amounts associated to card 104 by payment receiving mechanism 106 and validation mechanism 108. The payment amount is the monetary value received by payment receiving mechanism 106 as payment for card 104. The payment amount may be more, less or the same as the face value, which is the amount associated with card 104 which may be exchanged for goods and/or services. The face value is updated in real time when card 104 is used in a transaction or an event occurs which affects the value of the card (such as a promotion, reward program or change in policy associated with use of card 104).

Embodiments of system 100 may be further adapted and configured to track customer information, including but not limited to information about at least one customer, information about account holder behaviors, including but not limited to purchases, purchase patterns, interest expressed in goods or services or contacts with one or more identified vendors and storing at least some portion of said data in real time and allowing such data to be viewed on a computer interface. In other embodiments of system 100, issuing mechanism 101 may associate additional identifying information with card 104, such as information sufficient to identify the customer, but also identifies the vendor and exact location where card 104 is being used. In other embodiments of system 100, issuing mechanism 101, payment receiving mechanism 106, transaction information tracking mechanism 110, transaction relationship information tracking mechanism 111 and/or validation mechanism 108 may track additional or alternate information such as security information, market research information, information about the number of transactions, or types of transactions, information about events that may affect transactions, and/or information about one or more consumers involved in the transaction. Thus, one of ordinary skill in the art will recognize that the specific identifying information associated with card 104 can include any of that information set forth herein, or any other related information, alone or in combination. System 100 further includes recharge mechanism 117 to recharge a card and to reflect payments or additional monetary amounts applied to the certificate to increase, replenish, supplement or extend its face value.

Other embodiments of system 100 may further include a mechanism capable of associating card 104 with an identifying number (such a credit card account number, bank account number, membership number, randomly generated number, or any other number).

Figure 2:
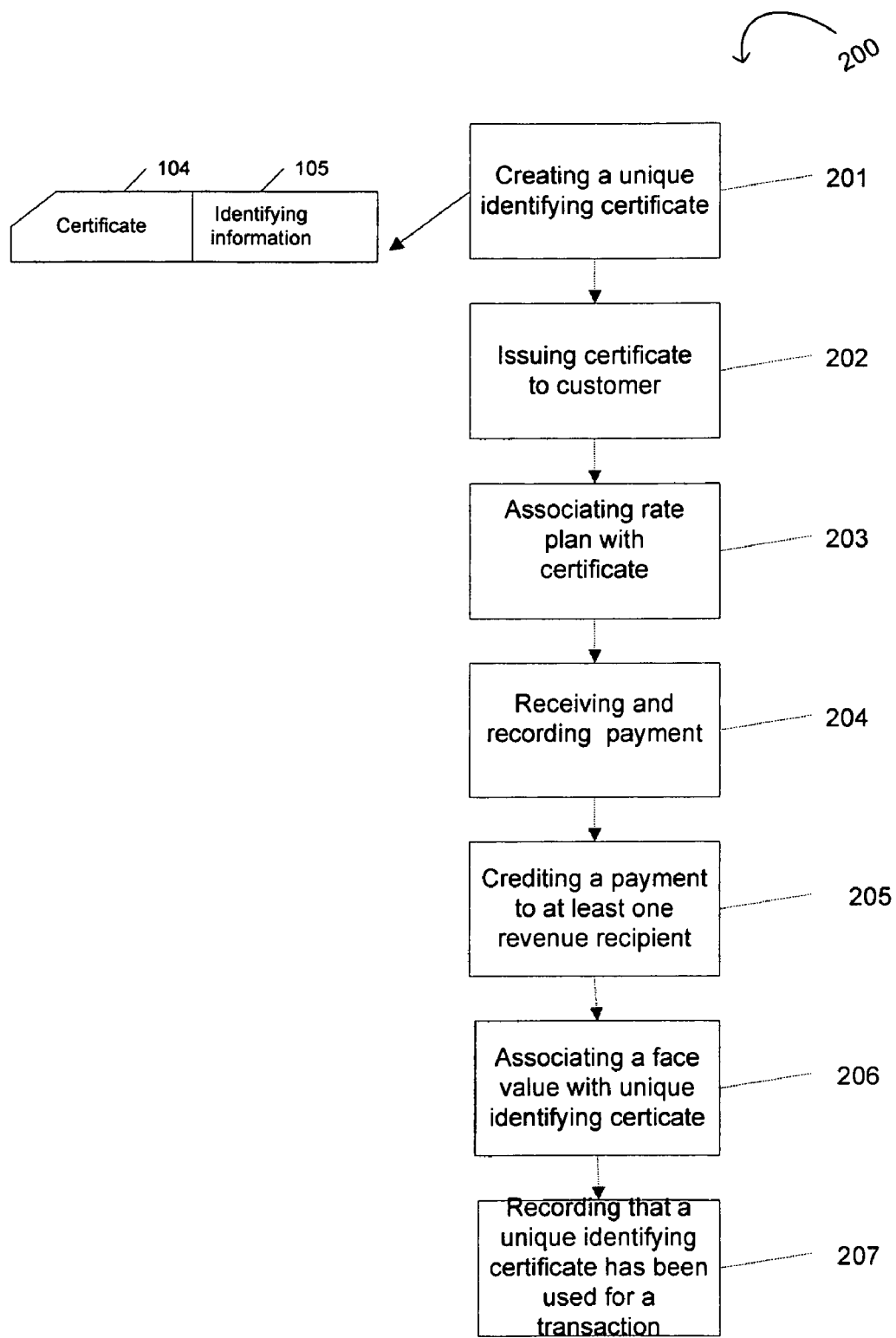
FIG. 2 is a flowchart representing one embodiment of the method.

FIG. 2 shows a flow chart illustrating an embodiment of the method for issuing and managing a unique identifying card for economic transactions 200. In step 201 a unique identifying card is created having a dollar amount or economic value determined by a redemption policy.

In step 202, the card is issued to a person or entity. In one embodiment of the invention, a card is purchased by a customer from a Website, downloaded and printed from the customer's personal computer. The card has a bar code which contains unique identifying information. In other embodiments, a card may be delivered to a person or entity by hand delivery, direct mail, e-mail, electronic distribution, downloading or by any other method or device capable of creating a card or tangible or symbolic representation of a card, and may include identifying information other than a bar code such as a numeric code, key word, or any other information capable of being printed on a card.

In step 203, a rate plan is associated with each unique identifying card, which identifies how revenue received from the card will be allocated among one or more revenue distribution recipients. Each card is associated with at least one rate plan based on a promotional campaign (as previously defined herein). For example, in one embodiment, a first rate plan may be in effect for cards when the volume of cards sold is below as a stated dollar amount or sales target. A second rate plan, reflecting a higher rate of sales commission, may be in effect for cards sold after the threshold or sales target is reached. In this embodiment, a higher commission could be paid to sales people that are revenue distribution recipients under the second rate plan for reaching the sales goal. The remaining revenue distribution recipients (e.g., vendors, advertisers, administrative and support) would receive adjusted amounts reflecting the higher sales commission paid under the rate plan. In other embodiments, rate plans may be associated with different time periods, marketing outlets, vendor relationships, product promotions, or any other criteria which may be a basis for a promotional campaign or other economic relationship. In other embodiments, one type or class of card (e.g., cards for a particular time frame or vendor) may have several different rate plans associated with cards issued under varying circumstances and having different attributes (e.g., dollar amount or denomination, location issued, time period issued, association with other marketing programs or promotional campaigns).

In step 204, the payment amount received for the card is recorded. In various embodiments, payment may be made by cash, credit card, previous credit amounts, or by any other transfer of economic value. In the embodiment shown, the card is activated contemporaneously or shortly after payment is recorded. However, other embodiments of the invention may include the additional step of activating the unique identifying card prior to use, particularly if cards are purchased in quantity for resale by an intermediary such as a nonprofit organization or other entity.

In step 205, the payment amount received for the card is credited to at least one revenue distribution recipient according to at lease one rate plan in effect for the card.

In step 206, the face value of the card is determined based on at least one redemption policy in effect.

In step 207, transaction is recorded to reflect that the card has been used and the face value of the card is adjusted or updated in real time to reflect the transaction.

Figure 3:
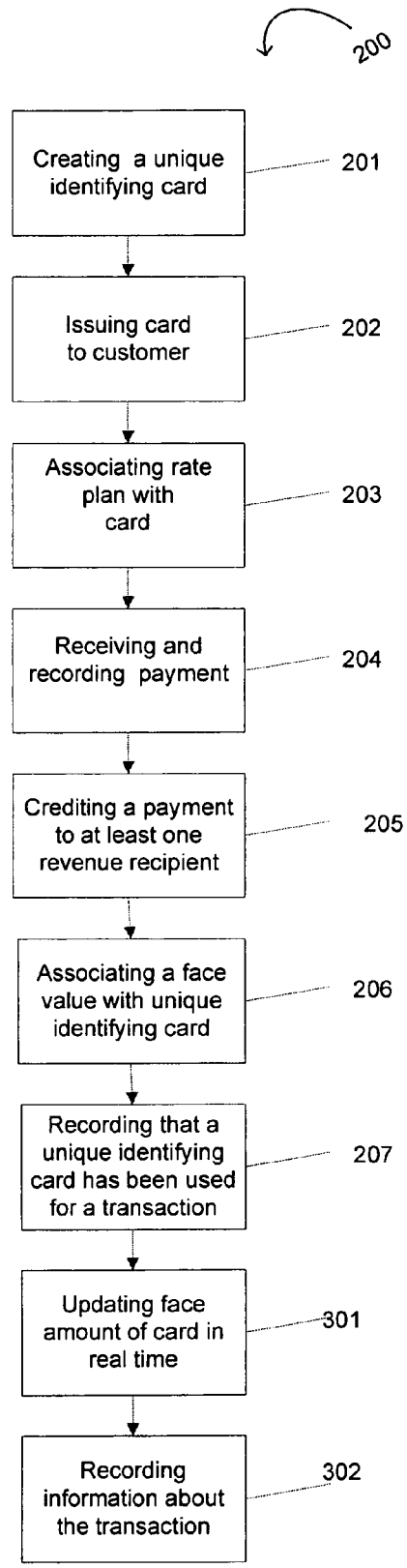
FIG. 3 shows a flow chart of an embodiment of the method in which the face amount of the card is updated in real time to reflect a transaction.

FIG. 3 shows a flow chart of an embodiment of the method which includes step 301 in which the face amount of the card is updated in real time when it is used in an economic transaction, and information about the transaction is recorded in step 302. Other embodiments of the method may not include this step. In one embodiment of the invention, transaction information includes the time, location, goods purchased, purchaser, demographic information, sales promotions and other information about the transaction is recorded. Other embodiments of the method may include more, less or different information relevant to a transaction, or may record only certain transactions. Further, other embodiments of the invention may have the capability to alter future transactions, redemption policies or rate plans associated with a card based on information about a transaction that is recorded.

Figure 4:
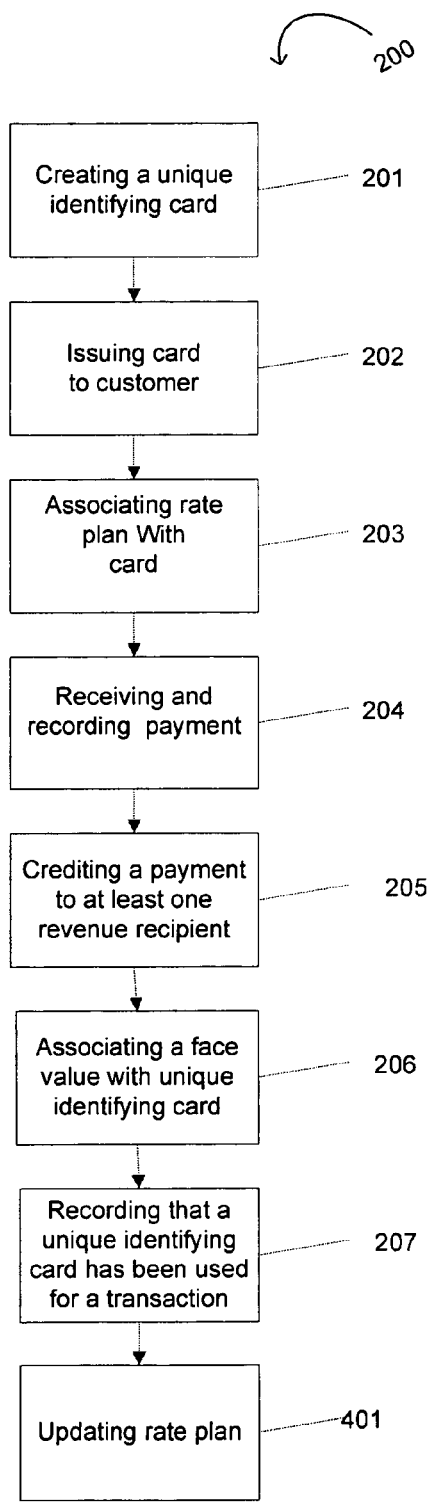
FIG. 4 shows a flow chart of an embodiment of the method in which a rate plan is updated.

FIG. 4 shows a flow chart of an embodiment of the method which includes step 401 of updating each rate plan by an authorized administrator.

Figure 5:
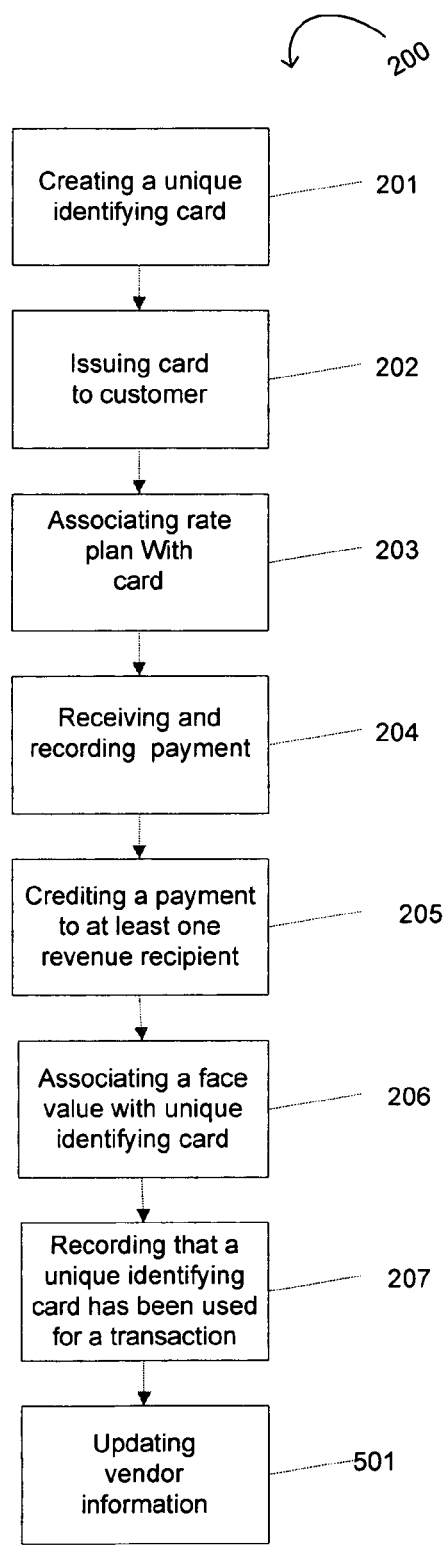
FIG. 5 shows a flow chart of an embodiment of the method in which information about one or more vendors is updated.

FIG. 5 shows a flow chart of an embodiment of the method which includes step 501 of updating information about one or more vendors.

Figure 6:
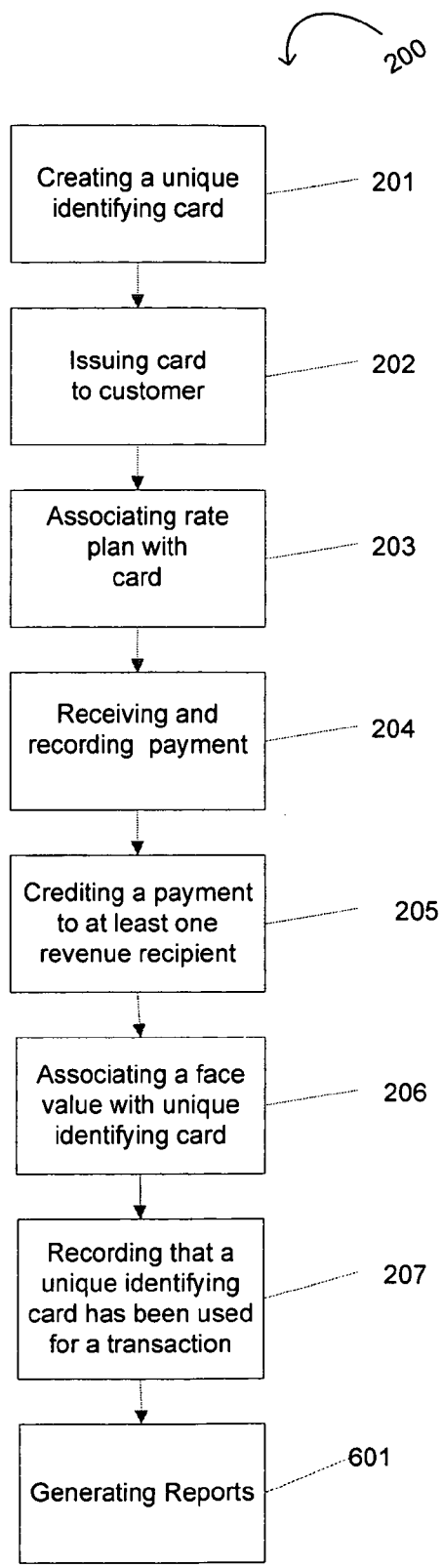
FIG. 6 shows a flow chart of an embodiment of the method which includes generating reports.

FIG. 6 shows a flow chart of an embodiment of the method which includes step 601 of generating reports which may be viewed on a computer interface, including reports about vendors, transactions, customers, rate plans, campaigns, and the status of payments, rate plans and promotions and of any other data or data relationship relevant to a card or transaction. However, alternate embodiments of system need not include report generating mechanism or may generate less or additional reports containing information which is more or less extensive.

Figure 7:
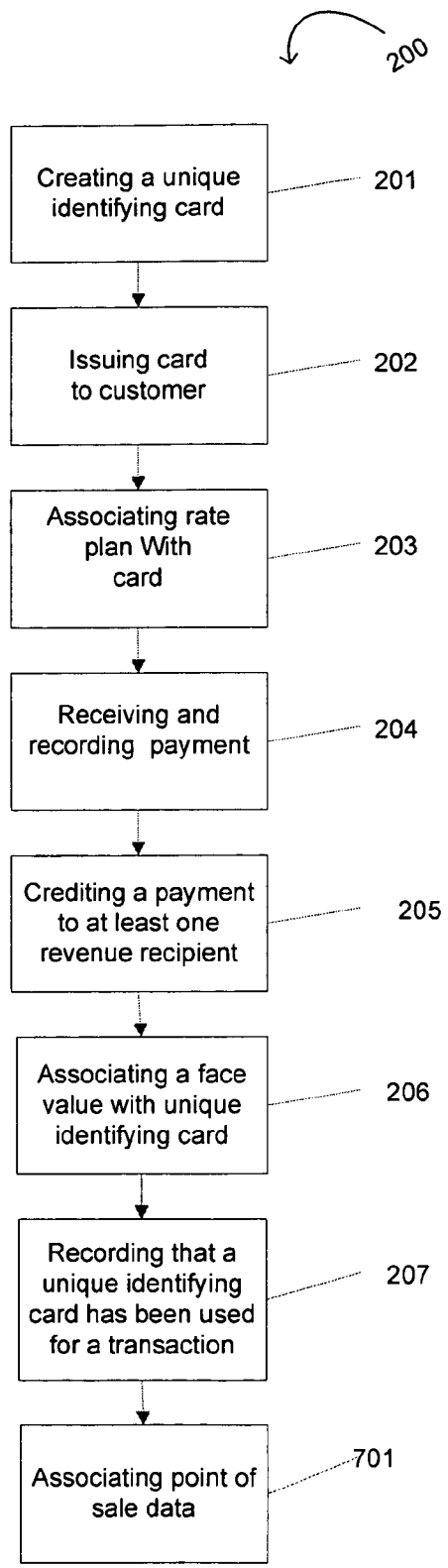
FIG. 7 shows a flow chart of an embodiment of the method which associates data about at least one point-of-use and at least one transaction with at least one unique identifying card and stores the data in real time so that the data is capable of being viewed on a computer interface.

FIG. 7 shows a flow chart of an embodiment of the method which includes step 701 of associating data about at least one point-of-use and at least one transaction with at least one unique identifying card and storing said data in real time so that said data is capable of being viewed on a computer interface.

Figure 8:
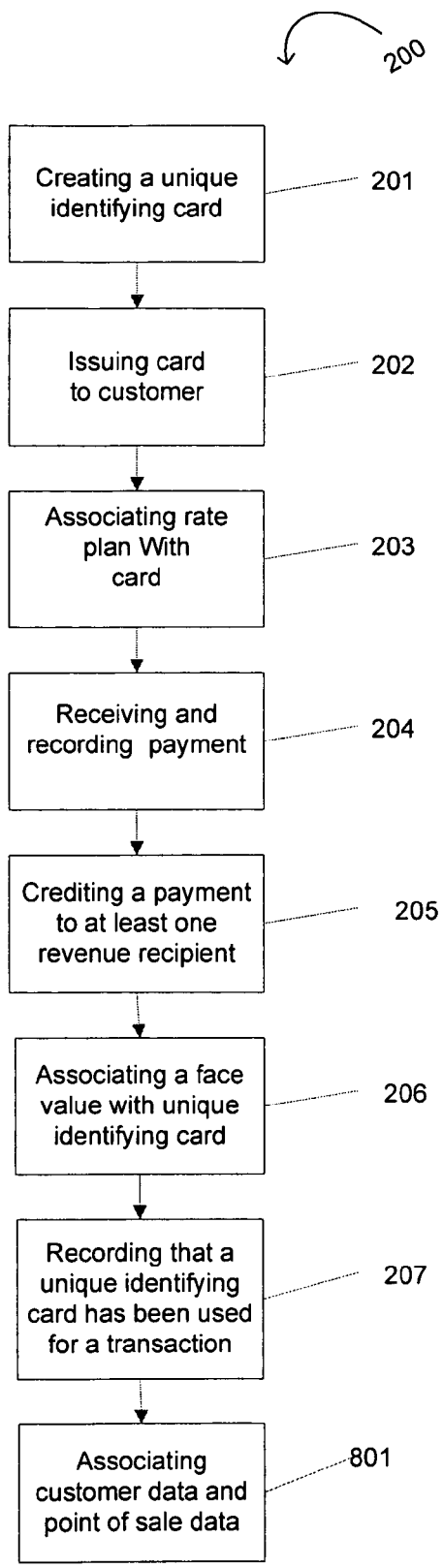
FIG. 8 shows a flow chart of an embodiment of the method which associates data about the point-of-use of the card with data about a customer in real time.

FIG. 8 shows a flow chart of an embodiment in which method further includes step 801 of associating data about at least one point-of-use and at least one transaction with at least one customer and storing the data in real time so that the data is capable of being viewed on a computer interface or other media.

Figure 9:
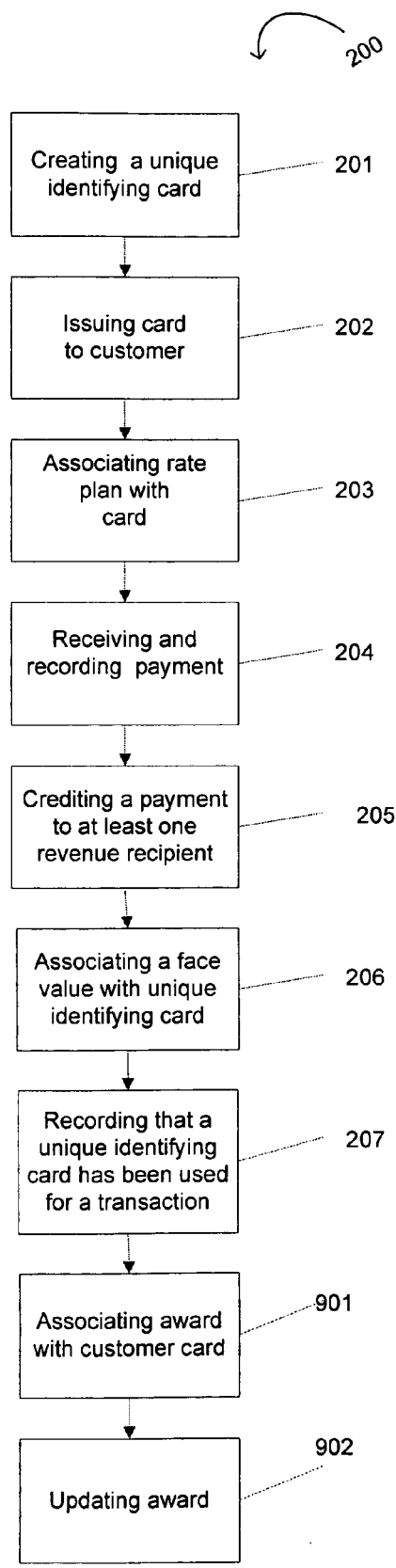
FIG. 9 shows a flow chart of an embodiment of the method which associates an award with a card.

FIG. 9 shows a flow chart in which the method further includes step 901 of associating an award with a card (including but limited to, discounts, goods, services, points which may acquire monetary value or credits for and additional monetary value with at least one unique identifying card) and step 902 of updating each award by an authorized administrator. Other embodiments of the method may update neither of steps 901 and 902, or only one of steps 901 and 902.

Figure 10:
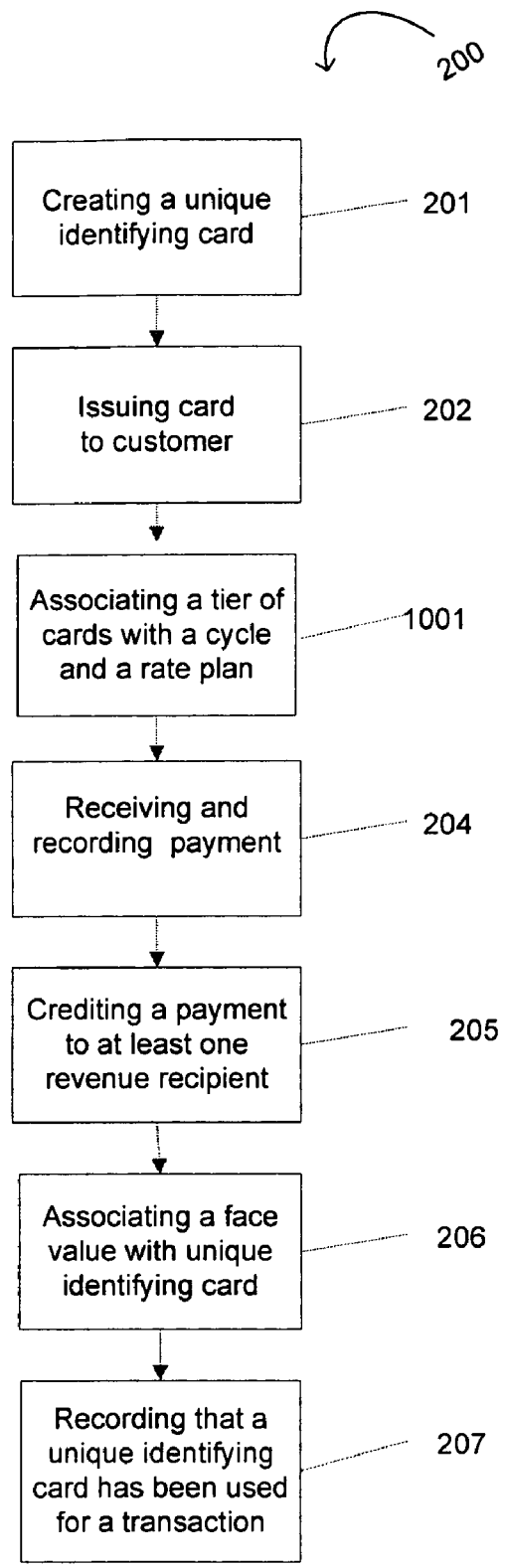
FIG. 10 shows a flow chart of an embodiment of the method which associates a plurality of rate plans with a plurality of unique identifying cards as part of a promotional campaign.

FIG. 10 shows a flow chart in which the method further includes step 1001 of associating a plurality of rate plans with a plurality of unique identifying cards, for example, in accordance with a campaign, promotion or other marketing plan, and determining which rate plan is in effect for a particular unique identifying card.

Figure 11:
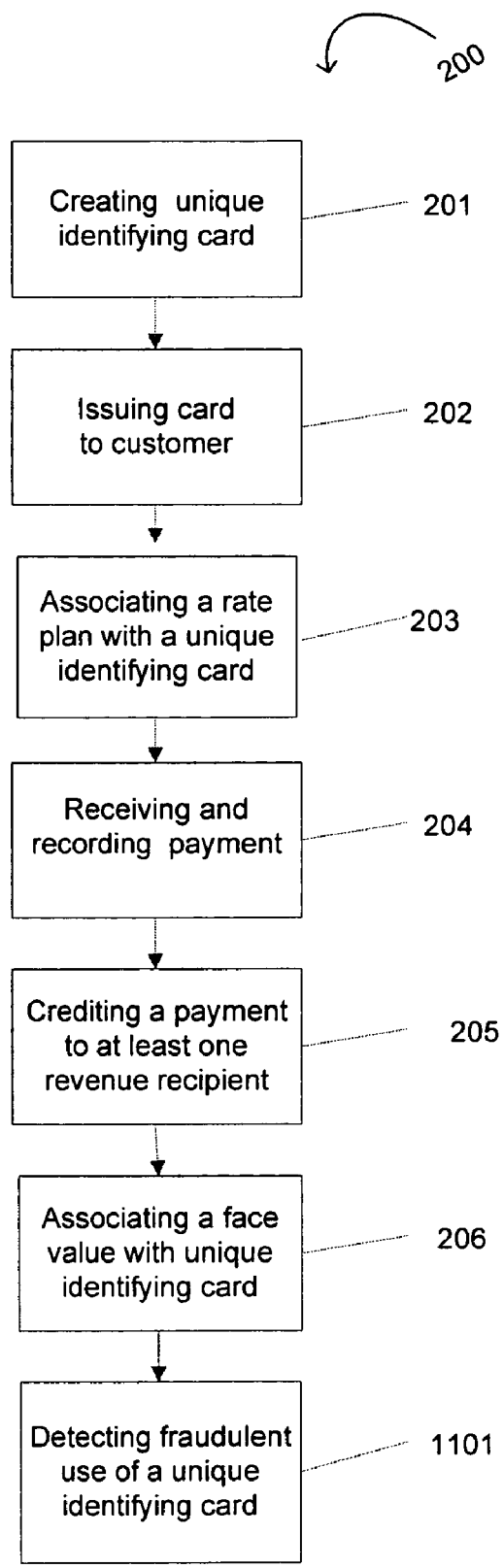
FIG. 11 shows a flow chart of an embodiment of the method which detects fraudulent use of a card in real time.

FIG. 11 shows a flow chart in which the method further includes the step 1101 of detecting fraudulent use of the card in real time.

Figure 12:
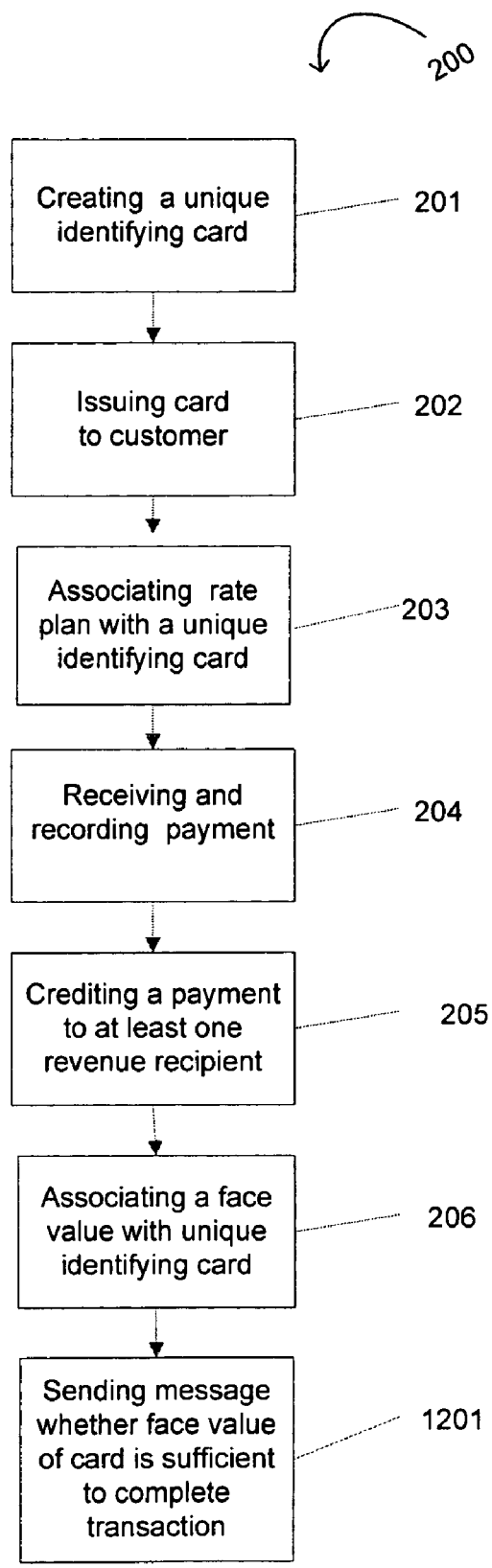
FIG. 12 shows a flow chart of an embodiment of the method which records that a card as been presented or used in a transaction and verifies that the card has a face value sufficient to complete the transaction in real time.

FIG. 12 shows a flow chart in which the method further includes step 1201 of recording that the card as been presented or used in a transaction and sending a message to the point-of-use or location, person or entity where the card is presented for use, and indicating in real time whether the card has a face value sufficient to complete the transaction. If the face value is sufficient, the face value of the card is updated in real time to reflect the value of the card subsequent to the transaction.

Figure 13:
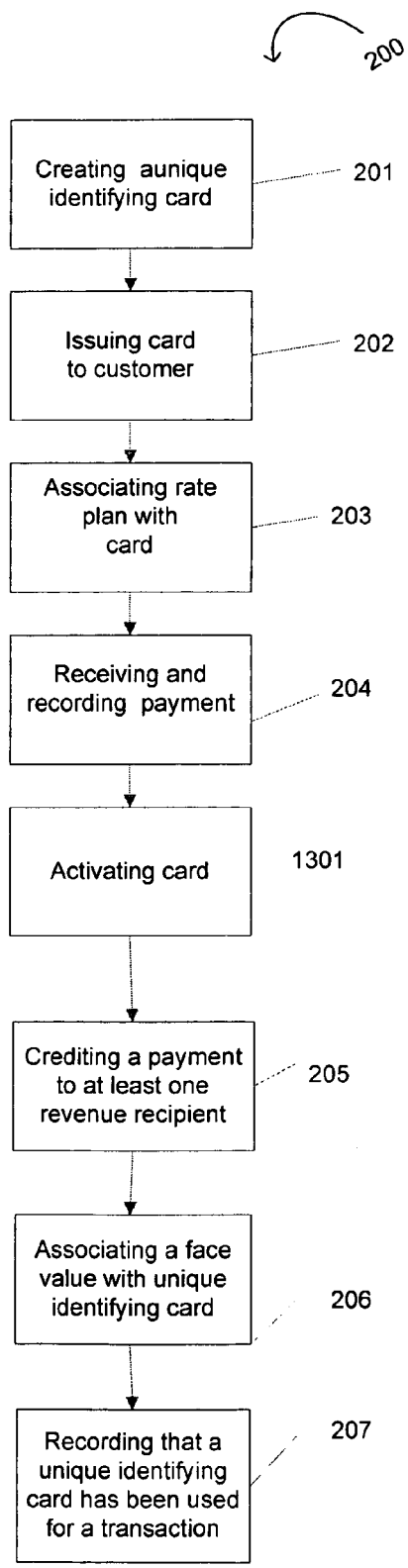
FIG. 13 shows a flow chart of an embodiment of the method which further includes activating cards after they are purchased by an intermediate issuer.

FIG. 13 shows a flow chart in which the method further includes step 1301 activating cards, such as gift cards purchased individually or in bulk, using a separate activation mechanism after they are purchased by an intermediate issuer. An intermediate issuer is at least one profit or non-profit entity, association, group or individual authorized to issue cards to one or more customers and to receive a payment from the customer which may be for more, less or equal to the face value of the card. The separate validation or activation process may or may not be required render a card issued by an account issuer to a customer.

Figure 14:
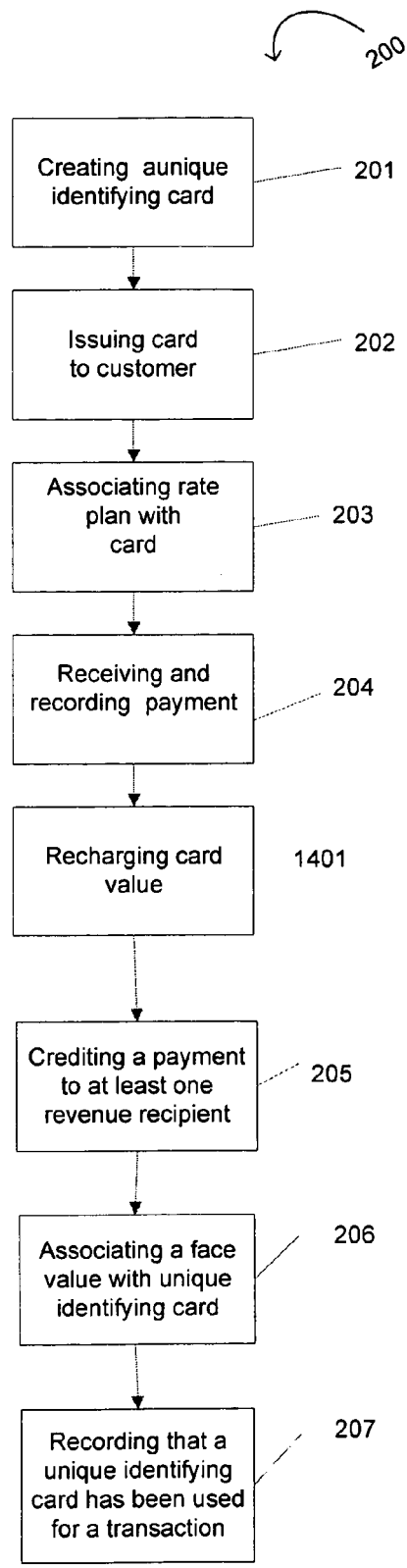
FIG. 14 shows a flow chart of an embodiment of the method which further includes recharging the value of a previously issued card.

FIG. 14 shows a flow chart in which the method further includes the step 1401 of supplementing or recharging the value of a previously issued card by a transaction, such as a payment or credit, which as the effect of increasing the face value of the card.

FIG. 15 shows a sample rate plan 1500 for allocating a payment received for a card as might be displayed on a computer interface or other medium. In the embodiment shown, code 1501 is entered to identify each card; however, other embodiments may not include a code. The embodiment shown further includes an entry for face value 1502 (as previously defined herein), although in other embodiments face value 1502 may or may not be entered. The embodiment shown includes discount amount 1503, which may be calculated in varying manners and which excluded from other embodiments, and includes a discounted value 1504 which may or may not be included in other embodiments and business code 1505 as well as agent code 1506 which may or may not be included in other embodiments. The embodiment shown further includes not for profit code 1507 as well as another area coordinator code 1508 which designates the portion of revenue (if any) to be allocated to an area coordinator. NFPC code 1509 indicates the amount to be allocated to a not for profit manager or coordinator and local coordinator code 1510 indicates the amount (if any to be allocated to a local sales manager. Click commission code 1511 indicates the amount to be allocated as commission from clicks on a website, and Media code 1512 indicates the amount to be allocated to media advertisers. Other embodiments may include fewer, more or different rate codes, and may refer to rate codes, allocations and revenue distribution recipients by different names. Additional codes may be created relating to revenue distribution recipients, including but not limited to investor groups, multiple media and association partners, additional agent networks and other codes which reflect participants entitled to share in revenue from a card transaction.

FIG. 16 illustrates a sample card. In the embodiment shown, card 1600 is made of paper and displays company logo or business name 1601 and card identification number 1604 which includes information about the ownership, face value, transactions and policies associated with the card as well as any other information capable of being tracked and associated with a numeric code, bar or magnetic strip 1605 which contains additional information associated with card 1600. Card 1600 may be made of other material such as plastic, card stock, a label or may be a unique identifying number in embodied in tangible or intangible form. The embodiment further shown includes magnetic strip 1605 which contains further information about the card. Further, in other embodiments, card 1600 may contain more, less or different information than that shown in FIG. 16. Other embodiments of the card may include additional information such as terms and conditions, vendor policies or any other information capable of being reproduced on a card.

While the system has been shown and described with respect to several embodiments in accordance with the present invention, it is to be understood that the same is not limited thereto, but is susceptible to numerous changes and modifications as known to a person skilled in the art, and it is intended that the present invention not be limited to the details shown and described herein, but rather cover all such changes and modifications obvious to one of ordinary skill in the art.

What is claimed is:

1. A transaction system comprising:
   an issuing mechanism capable of issuing at least one unique identifying card to a customer;
   a rate plan tracking mechanism capable of associating at least one rate plan with said at least one unique identifying card and allowing each of said at least one rate plan to be changed by an authorized administrator;
   a payment receiving mechanism capable of receiving and recording a payment amount from said customer, associating a face value to said at least one unique identifying card, and crediting said payment amount to at least one revenue recipient based upon said at least one rate plan in real time; and
   a validation mechanism capable of recording that said unique identifying card is presented at a point-of-use and updating said face value associated with said unique identifying card in real time to reflect a transaction based on at least one redemption policy.

2. The transaction system of claim 1, wherein said transaction system further includes a vendor tracking mechanism capable of maintaining information about one or more vendors.

3. The transaction system of claim 1, wherein said transaction system further includes a report generating mechanism capable of generating one or more reports.

4. The transaction system of claim 1, wherein said transaction system further includes a mechanism capable of associating data about said point-of-use and said transaction with said at least one unique identifying card and storing said data in real time and allowing said data to be viewed on a computer interface.

5. The transaction system of claim 1, wherein said transaction system further includes a mechanism capable of associating data about said at least one unique identifying card with information about said customer and storing at least a portion of said data in real time and allowing said data to be viewed on a computer interface.

6. The transaction system of claim 1, wherein said transaction system further includes a mechanism capable of associating at least one award selected from a group comprised of points, discounts, goods, services and additional monetary value with said at least one unique identifying card and allowing each of said at least one award to be changed by said authorized administrator.

7. The transaction system of claim 1, wherein said transaction system further includes a mechanism capable of simultaneously associating said at least one rate plan with a plurality of said at least one unique identifying cards and determining which of said at least one rate plan is in effect for each of said at least one unique identifying card based upon a promotional campaign.

8. The transaction system of claim 1, wherein said transaction system further includes a mechanism capable of associating at least one tier of cards with said at least one rate plan and at least one cycle to create a promotional campaign.

9. The transaction system of claim 1, wherein said transaction system further includes a mechanism capable of detecting a fraudulent use of said at least one unique identifying card in real time.

10. A transaction system comprising:
    an issuing mechanism capable of issuing at least one unique identifying card to a customer;
    a rate plan tracking mechanism capable of associating at least one rate plan with at least one unique identifying card and allowing each of said at least one rate plan to be changed by an authorized administrator;
    a payment receiving mechanism capable of receiving and recording a payment amount from said customer, associating a face value to at least one unique identifying card, designating said at least one unique identifying card so that said at least one unique identifying card may be accepted by at least one vendor as a method of payment, and crediting said payment amount to at least one revenue recipient based upon said at least one rate plan in real time; and
    a validation mechanism capable of recording that said unique identifying card is presented at a point-of-use, sending a message to said point-of-use indicating in real time whether said at least one unique identifying card has said face value sufficient to complete a transaction and updating said face value of said unique identifying card if said transaction can be completed to reflect said transaction in real time.

11. The transaction system of claim 10, wherein said system further includes a vendor tracking mechanism capable of maintaining information about one or more vendors.

12. The transaction system of claim 10, wherein said system further includes a report generating mechanism capable of generating one or more reports.

13. The transaction system of claim 10, wherein said transaction system further includes a mechanism capable of associating data about said point-of-use and said transaction with said at least one unique identifying card and storing said data in real time and allowing said data to be viewed on a computer interface.

14. The transaction system of claim 10, wherein said system further includes a mechanism capable of associating data about said at least one unique identifying card with information about said customer and storing at least a portion of said data in real time and allowing such data to be viewed on a computer interface.

15. The transaction system of claim 10, wherein said system further includes a mechanism capable of associating at least one award selected from a group comprised of points, discounts, goods, services and additional monetary value with said at least one unique identifying card and allowing said at least one award to be changed by said authorized administrator.

16. The transaction system of claim 10, wherein said system further includes a mechanism capable of simultaneously associating at least one rate plan with a plurality of unique identifying card and determining which of said at least one rate plan is in effect for said at least one unique identifying card based on a promotional campaign.

17. The transaction system of claim 10, wherein said transaction system further includes a mechanism capable of associating at least one tier of said unique identifying cards with at least one said rate plan and at least one cycle to create a promotional campaign.

18. The transaction system of claim 10 wherein said system further includes mechanism capable of detecting a fraudulent use of said at least one unique identifying card in real time.

19. A method of managing at least one unique identifying card comprising the steps of:
   creating said at least one unique identifying card,
   issuing said at least one unique identifying card to at least one customer;
   associating at least one rate plan with said at least one unique identifying card in real time;
   receiving and recording a payment amount from said at least one customer;
   crediting said payment amount to at least one revenue recipient based upon at least one of said at least one rate plan in real time;
   associating a face value to said at least one unique identifying card in real time; and
   recording that said at least one unique identifying card has been used for a transaction in real time.

20. The method of claim 19, wherein said method further includes the step of updating said face value associated with said at least one unique identifying card in real time to reflect a transaction based on at least one redemption policy.

21. The method of claim 19, wherein said method further includes updating each of said rate plan by an authorized administrator.

22. The method of claim 19, wherein said method further includes associating said at least one tier of said unique identifying cards with said at least one rate plan and at least one cycle to create a promotional campaign.

23. The method of claim 19, wherein said method further includes tracking information about one or more vendors.

24. The method of claim 19, wherein said method further includes generating one or more reports.

25. The method of claim 19, wherein said method further includes a step of associating data about said at least one point-of-use and said transaction with said at least: one unique identifying card and storing said data in real time so that said data is capable of being viewed on a computer interface.

26. The method of claim 19, wherein said method further includes the step of associating data about at least one point-of-use and said transaction with said at least one customer and storing said data in real time so that said data is capable of being viewed on a computer interface.

27. The method of claim 19, wherein said method further includes a step of associating at least one award selected from a group comprised of points, discounts, goods, services and additional monetary value with said at least one unique identifying card and updating each of said at least one award by an authorized administrator.

28. The method of claim 19, wherein said method further includes a step of associating a plurality of said at least one rate plan with a plurality of said at least one unique identifying card, and determining which of said at least; one rate plan is in effect for said at least one unique identifying card.

29. The method of claim 19, wherein said method further includes a step of detecting a fraudulent use of said at least one unique identifying card in real time.

30. The method of claim 19, wherein said method further includes a computer readable medium having stored therein instructions for causing a processor to execute said method.

31. The method of claim 19, wherein said method is performed by a computer system, said computer system comprised of a processor, a memory and an operating environment.

32. A method of managing at least one unique identifying card comprising the steps of:
   creating said at least one unique identifying card;
   issuing said at least one unique identifying card to at least one customer;
   associating at least one rate plan with said at least one unique identifying card;
   receiving and recording a payment amount from said at least one customer;
   designating said at least one unique identifying card so that said at least one unique identifying card may be accepted by at least one vendor as a method of payment;
   crediting said payment amount to at least one revenue recipient based upon said at least one rate plan in real time;
   associating a face value to said at least one unique identifying card; and
   validating that said at least one unique identifying card has said face value sufficient to complete a transaction, and if said face value is sufficient, updating said face value associated with said at least one unique identifying card in real time to reflect said transaction.

33. The method of claim 32, wherein said method further includes a step of updating each of said at least one rate plan by an authorized administrator.

34. The method of claim 32, wherein said method further includes associating said at least one tier of said cards with at least one said rate plan and at least one cycle to create a promotional campaign.

35. The method of claim 32, wherein said method further includes a step of tracking information about one or more vendors.

36. The method of claim 32, wherein said method further includes a step of generating one or more reports.

37. The method of claim 32, wherein said method further includes a step of associating data about at least one point-of-use and said transaction with said at least one unique identifying card and storing said data in real time 80 that said data is capable of being viewed on a computer interface.

38. The method of claim 32, wherein said method further includes a step of associating said data about said at least one point-of-use and said transaction with said at least one customer and storing said data in real time so that said data is capable of being viewed on a computer interface.

39. The method of claim 32, wherein said method further includes a step of associating at least one award selected from a group comprised of points, discounts, goods, services and additional monetary value with said at least one unique identifying card and updating said at least one award by an authorized administrator.

40. The method of claim 32, wherein said method further includes a step of associating a plurality of said at least one rate plan with a plurality of at least one unique identifying card and determining which of said at least one rate plan is in effect for each of said at least one unique identifying card.

41. The method of claim 32, wherein said method further includes a step of detecting a fraudulent use of said at least one unique identifying card.

42. The method of claim 32, wherein said method further includes a computer readable medium having stored therein instructions for causing a processor to execute said method.

43. The method of claim 32, wherein said method is performed by a computer system, said computer system comprised of a processor, a memory and an operating environment.

44. An apparatus for managing at least one unique identifying card comprising:

an input mechanism, said input mechanism constructed and adapted to receive a message identifying at least one customer;

an issuing mechanism, said issuing mechanism constructed and adapted to issue at least one unique identifying card to said at least one customer and to associate a face value with said at least one unique identifying card; and a payment receiving mechanism, said payment receiving mechanism constructed and adapted to receive payment for said at least one unique identifying card and to credit said payment based upon at least one rate elan to at least one revenue recipient in real time.

45. The apparatus of claim 44 further comprising a rate plan tracking mechanism, said rate plan tracking mechanism constructed and adapted to associate at least one rate plan with said at least one unique identifying card and allowing said at least one rate plan to be changed by an authorized administrator.

46. The apparatus of claim 44 further comprising a promotional campaign tracking mechanism, said promotional campaign tracking mechanism constructed and adapted to associate at least one rate plan with at least one tier of unique identifying cards and at least one cycle and allowing said at least one promotional campaign to be changed by an authorized administrator.

47. The apparatus of claim 44 further comprising a validation mechanism, said validation mechanism constructed and adapted to associate that said at least one unique identifying card is presented at a point-of-use and updating said face value associated with said at least one unique identifying card in real time to reflect a transaction based on at least one redemption policy.

48. The apparatus of claim 44 further comprising a vendor tracking mechanism, said vendor tracking mechanism constructed and adapted to track information associated with one or more vendors.

49. The apparatus of claim 44 further comprising a report generating mechanism, said report generating mechanism constructed and adapted to generate one or more reports.

50. The apparatus of claim 44 further comprising a validation mechanism, said validation mechanism constructed and adapted to record that said at least one unique identifying card is presented at a point-of-use and indicating whether said at least one unique identifying card has said face value sufficient to complete a transaction and updating said face value of said at least one unique identifying card if said transaction is completed.

\* \* \* \* \*